United States Patent [19]

Kojo et al.

[11] Patent Number: 4,560,732

[45] Date of Patent: Dec. 24, 1985

[54] COATING COMPOSITION

[75] Inventors: Hidehiko Kojo, Koshigaya; Koji Akimoto, Tokyo; Kazuhiro Urihara, Kasukabe, all of Japan

[73] Assignee: Asahi Denka Kogyo K.K., Tokyo, Japan

[21] Appl. No.: 667,250

[22] Filed: Nov. 1, 1984

[30] Foreign Application Priority Data

Nov. 11, 1983 [JP] Japan .................................. 58-212200
Nov. 30, 1983 [JP] Japan .................................. 58-226528

[51] Int. Cl.$^4$ .............................................. C08G 59/14
[52] U.S. Cl. ...................................... 525/481; 528/98; 528/100; 528/104; 528/107; 427/386; 428/418
[58] Field of Search ................. 528/98, 100, 104, 107, 528/108; 525/481; 428/418

[56] References Cited

U.S. PATENT DOCUMENTS

| | | | |
|---|---|---|---|
| 2,167,073 | 7/1939 | Herstein | 528/100 X |
| 2,541,027 | 2/1951 | Bradley | 528/108 X |
| 2,732,367 | 1/1956 | Shokal | 528/108 X |
| 2,887,404 | 5/1959 | Evans | 528/108 X |
| 3,245,940 | 4/1966 | Ronay et al. | 528/108 X |
| 4,340,716 | 7/1982 | Hata et al. | 528/100 |
| 4,360,613 | 11/1982 | Shimp | 528/108 X |

Primary Examiner—Earl Nielsen
Attorney, Agent, or Firm—Flynn, Thiel, Boutell & Tanis

[57] ABSTRACT

A coating composition comprising the reaction product obtained by reacting an epoxy resin with a polynuclear polyhydroxy phenol having adjacent hydroxy groups, polyol esters of polyhydroxy phenolic carboxylic acids having adjacent hydroxy groups or a phosphorus compound.

6 Claims, No Drawings

COATING COMPOSITION

BACKGROUND OF THE INVENTION

The present invention relates to a coating composition and, more particularly, relates to a superior, anticorrosive, lacquer-type, coating composition for metals, which composition contains a self-drying resin. The coating composition of the invention is able to form chelate bonds with metal to provide the strong adhesion to the metal. Especially, the present invention relates to a coating composition having superior adherence and anticorrosive properties not only when applied to steel plate which is not rusty or which has been treated to remove the rust before the application of the coating, up to the grade of St (or Sa) 2.5 of Swedish Standard SIS 05 59 00, but also when applied to rusty steel plate, insufficiently de-rusted steel plate, zinc-coated steel plate, aluminum and stainless steel.

Lacquer-type coating compositions used in the prior art had only the property of penetrating into rust on steel plate and were used in limited fields because of their reduced adherence and anticorrosive properties.

SUMMARY OF THE INVENTION

Accordingly, an object of the present invention is to provide a coating composition that exhibits good adherence and good anticorrosive properties when it is coated on poorly treated (de-rusted) metal surfaces or even on a rusty surface of a grade of SIS Sa 1 to 1.5. The coating composition of the present invention contains, as essential components, the high molecular weight reaction product of the reaction between;

(A) an epoxy resin having the following general formula

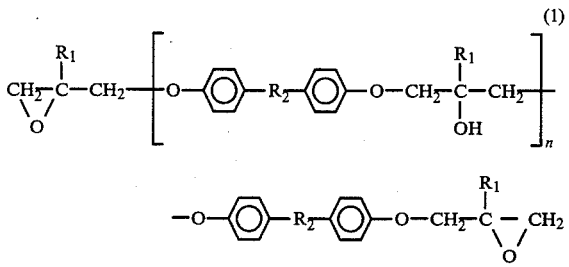

wherein $R_1$ is H or $CH_3$; $R_2$ is $-CH_2-$ or

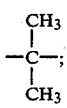

and n is a number of from 0 to 35, and, (B) at least one compound selected from the group consisting of;

(B-1) polynuclear polyhydroxy phenols having adjacent hydroxy groups, (B-2) polyol esters of polyhydroxy phenolic carboxylic acids having adjacent hydroxy groups, (B-3) a phosphorus compound such as acids of phosphorus having at least one P-OH group, esters thereof, salts thereof and mixtures thereof and (B-4) mixtures of two or more of the (B-1), (B-2) and (B-3) materials;

dissolved or dispersed in a solvent.

The high molecular weight reaction product employed in the present invention is obtained by the reaction, under heating, of epoxy resin (A) having the general formula (1) with either (B) at least one compound selected from the group consisting of polynuclear polyhydroxy phenols having adjacent hydroxy groups (B-1), polyol esters of polyhydroxy phenolic carboxylic acids having adjacent hydroxy groups (B-2), and mixtures of (B-1), (B-2) and (B-3), preferably (B-1) and (B-2), the reactants being reacted in such a molar ratio that hydroxy groups remain in the reaction product, or (II) a phosphorus compound, such as acids of phosphorus having at least one P-OH group, esters thereof, salts thereof and mixtures thereof (B-3) in such a ratio that the ratio of the hydroxy groups (or corresponding salt or ester groups) of the phosphorus compound(s)/epoxy groups in the epoxide resin (A)=about 1/1.

Although the reaction temperature is not critical, it is lower than the decomposition temperature of the epoxy resin employed and it is high enough to finish the reaction within the desired time. Usually, the reaction proceeds at 50°–150° C., preferably, when phosphorus compounds are used, at 50°–130° C.

DETAILED DESCRIPTION OF THE INVENTION

The epoxy resins (A) which can be used in this invention include an epoxy compound having two glycidyl ether groups in the molecule, such as the diglycidyl ether of bisphenol A or the diglycidyl ether of bisphenol F, having the prescribed molecular weight determined by the value of n. The value of n can vary from 0 to 35, preferably from 5 to 30. It is more preferable that n is from 10 to 25 when the epoxy resin is reacted with phenolic polyols (B-1) or (B-2). It is more preferable that n is from 5 to 10 when the epoxy resin is reacted with phosphorus compounds (B-3).

The preferred examples of the polynuclear polyhydroxy phenols having adjacent hydroxy groups (B-1) used in the present invention are the condensation products of formaldehyde and the following polyhydroxy phenols having at least one hydroxy group adjacent to another hydroxy group. The preferred examples of the polyhydroxy phenols are catechol, catechol-3-carboxylic acid and esters thereof, catechol-4-carboxylic acid and esters thereof, pyrogallol, pyrogallol-4-carboxylic acid and esters thereof, pyrogallol-4,6-dicarboxylic acid and esters thereof, gallic acid and esters thereof, tannic acid and esters thereof, and urushiol.

When the above-mentioned polyhydroxy phenols are condensed with formaldehyde, other phenols such as phenol, cresol, hydroquinone, salicyclic acid, etc. can be co-condensed therewith at the same time.

The preferred examples of the polyol esters of the polyhydroxy phenolic carboxylic acids having adjacent hydroxy groups (B-2) are aliphatic polyol esters. The preferred examples of aliphatic polyols are diols such as ethylene glycol, propylene glycol, butylene glycol, 1,6-hexanediol, diethylene glycol, dipropyleneglycol, triethylene glycol, tripropylene glycol, etc., triols such as glycerin, trimethylol propane, etc., higher polyols such as pentaerythritol, sorbitol, glucose, etc.

The preferred examples of the polyhydroxy phenolic carboxylic acids are catechol-3-carboxylic acid, catechol-4-carboxylic acid, gallic acid, m-galloyl gallic acid, pyrogallol-4-carboxylic acid, pyrogallol-4,6-dicarboxylic acid and tannic acid.

The structure of the ester of glycerin and catechol-4-carboxylic acid, as an example, is as follows:

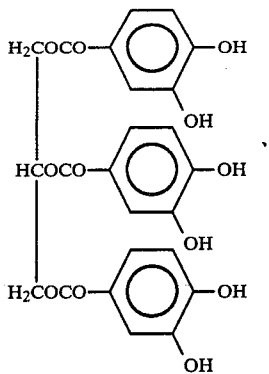

When a polycarboxylic compound is used, the esters can contain higher condensation products.

When the above-mentioned polyhydroxy phenols are condensed with polyols, other phenolic carboxylic acids such as salicyclic acid, p-hydroxy benzoic acid, etc. can be co-condensed therewith at the same time.

Preferred examples of the acids (B-3) of phosphorus are ortho-phosphoric acid, meta-phosphoric acid, pyrophosphoric acid, phosphorous acid, polyphosphoric acid, phosphonic acid, phosphinic acid, etc. The most preferred example is ortho phosphoric acid.

The esters of acids of phosphorus are the esters of the above-mentioned acids of phosphorus. Preferred examples are alkyl esters having one or more $C_1$ to $C_8$ alkyl groups and at least one hydroxy group, and hydroxy alkyl esters.

Preferred (hydroxy)alkyl groups are ethyl, propyl, n-butyl, 2-ethylhexyl, hydroxyethyl, hydroxypropyl, hydroxybutyl, hydroxypentyl and the like.

Among them, the most preferred esters are n-butyl or 2-ethylhexyl mono- or di-phosphates.

The salts are the salts of above-mentioned acids of phosphorus. Examples of the salts are the potassium, sodium, lithium, calcium, zinc, aluminum, tin, barium and like salts. The preferred examples are the potassium, sodium or calcium mono- or di-phosphate salts.

The high molecular weight reaction product to be used in the invention has adjacent hydroxyl groups or phosphoric acid groups therein to form chelate bonds with the metal surface when it applies to metal.

The organic solvent used in the present invention is non-reactive under the reaction conditions and is suitable for use as a liquid vehicle in the coating composition. The solvent includes, for example, ketones such as methyl ethyl ketone, methyl isobutyl ketone, cyclohexanone and the like; cellosolves such as ethyl cellosolve, butyl cellosolve, cellosolve acetate and the like; chlorine-containing solvents such as tetrachloro ethylene, trichloroethylene and the like; and mixed solvents such as mixtures of aromatic solvents such as toluene, xylene and the like and alcoholic solvents such as isopropyl alcohol, butanol and the like.

The molar reaction ratio of the epoxy resin (A) to (B-1) and/or (B-2) is a ratio such that hydroxy groups remain in the reaction product. More specifically, the molar ratio of (epoxy groups in component (A))/(hydroxy groups in component (B-1) and/or component (B-2))=0.3 to 0.01, preferably 0.1–0.05. The molar reaction ratio of the epoxy resin (A) to component (B-3) is the ratio such that epoxy groups in (A) and hydroxy groups (or corresponding salt or ester groups) is nearly an equimolar ratio. More specifically, the molar ratio of (epoxy groups in component (A))/(hydroxy or its derivative groups in component (B-3))=0.85–1.15, preferably 0.9–1.10. The reaction product is obtained by heating the reactants, in presence of the solvent. The number average molecular weight of the reaction product is preferably more than 10,000.

The coating composition of the present invention can contain, if necessary, other resins, diluents, solvents, colorants, dehydrating agents, pigments, anticorrosive pigments such as glass flakes, fillers and other additives.

After it has been coated on the substrate in any conventional manner, the coating composition can be dried under ambient conditions. However, it can be dried under elevated temperatures, if necessary. The effect of the present invention is to provide a coating composition having good adherence and good anticorrosive properties, even if it is coated directly on a rusty steel plate or on a poorly treated (de-rusted) steel plate.

In the following Examples the term "parts" means parts by weight unless otherwise noted.

PREPARATION 1 (INVENTION)

100 parts of diglycidyl ether of bisphenol A (epoxide equivalent=2,300), 10 parts of condensation product (molecular weight=450) of catechol and formaldehyde, 110 parts of cyclohexanone and 0.1 parts of triethylamine, as catalyst, were mixed and reacted for 15 hours, at 120°–130° C., with agitation.

A reaction product (I) having a number average molecular weight of 12,000 was obtained.

PREPARATION 2 (INVENTION)

100 parts of diglycidyl ether of bisphenol F (epoxide equivalent=3,000), 8 parts of triglyceride of catechol-4-carboxylic acid (molecular weight=500), 70 parts of ethyl cellosolve and 0.15 parts of dimethyl benzyl amine, as catalyst, were mixed and reacted for 16 hours, at 130° C., with agitation.

A reaction product (II) having a number average molecular weight of 25,000 was obtained.

PREPARATION 3 (INVENTION)

100 parts of diglycidyl ether of bisphenol A (epoxide equivalent=3,500), 5 parts of glucose ester of galloyl gallic acid ester, 60 parts of methyl isobutyl ketone and 0.2 parts of triethylamine, as catalyst, were mixed and reacted for 10 hours, at 120° C., with agitation.

A reaction product (III) having a number average molecular weight of 13,500 was obtained.

PREPARATION 4 (COMPARISON)

100 parts of diglycidyl ether of bisphenol A (epoxide equivalent=2,300), 15 parts of bisphenol A, 110 parts of cyclohexanone and 0.1 parts of triethylamine, as catalyst, were mixed and reacted for 15 hours, at 130° C., with agitation.

A reaction product (IV) having a number average molecular weight of 14,000 was obtained.

PREPARATION 5 (COMPARISON)

100 parts of diglycidyl ether of bisphenol F (epoxide equivalent=3,000), 6.5 parts of bisphenol F, 70 parts of ethyl cellosolve and 0.15 parts of dimethyl benzyl amine, as catalyst, were mixed and reacted for 10 hours, at 130° C., with agitation.

A reaction product (V) having a number average molecular weight of 21,000 was obtained.

PREPARATION 6 (COMPARISON)

100 parts of diglycidyl ether of bisphenol A (epoxide equivalent=3,500), 6 parts of bisphenol A, 60 parts of methyl isobutyl ketone and 0.2 parts of triethylamine, as catalyst, were mixed and reacted for 10 hours, at 120° C., with agitation.

A reaction product (VI) having a number average molecular weight of 14,000 was obtained.

PREPARATION 7 (INVENTION)

100 parts of di-methylglycidyl ether of bisphenol F (epoxide equivalent=5,500), 8 parts of condensation product (molecular weight=390) of pyrogallol and formaldehyde, 120 parts of cyclohexanone and 2 parts of triethylamine, as catalyst, were mixed and reacted for 10 hours, at 120°-130° C., with agitation.

A reaction product (VII) having a number average molecular weight of 14,500 was obtained.

PREPARATION 8 (COMPARISON)

100 parts of di-methylglycidyl ether of bisphenol F (epoxide equivalent=3,000), 3.5 parts of bisphenol A, 150 parts of cyclohexanone and 2 parts of triethylamine, as catalyst, were mixed and reacted for 15 hours, at 120°-130° C. with agitation.

A reaction product (VIII) having a number average molecular weight of 25,000 was obtained.

PREPARATION 9 (INVENTION)

100 parts of diglycidyl ether of bisphenol A (epoxide equivalent=300), 19 parts of monobutyl orthophosphate and 80 parts of methyl isobutylketone were mixed and reacted for 15 hours, at 80° C., with agitation.

A reaction product (IX) having a number average molecular weight of 25,000 was obtained.

PREPARATION 10 (INVENTION)

100 parts of diglycidyl ether of bisphenol A (epoxide equivalent=2,300), 3.2 parts of monopotassium phosphate and 70 parts of ethyl cellosolve were mixed and reacted for 10 hours at 90° C. with agitation.

A reaction product (X) having a number average molecular weight of 18,500 was obtained.

PREPARATION 11 (INVENTION)

100 parts of di-methylglycidyl ether of bisphenol A (epoxide equivalent=3,500), 3.5 parts of diethyl pyrophosphate and 100 parts of cyclohexanone were mixed and reacted for 10 hours, at 70° C., with agitation.

A reaction product (XI) having a number average molecular weight of 13,500 was obtained.

PREPARATION 12 (COMPARISON)

100 parts of diglycidyl ether of bisphenol A (epoxide equivalent=300), 74 parts of bisphenol A, 100 parts of methyl isobutylketone and 0.1 parts of triethylamine, as catalyst, were mixed and reacted for 18 hours, at 100° C., with agitation.

A reaction product (XII) having a number average molecular weight of 31,000 was obtained.

PREPARATION 13 (COMPARISON)

100 parts of diglycidyl ether of bisphenol F (epoxide equivalent=2,300), 4.5 parts of bisphenol F, 70 parts of ethyl cellosolve and 0.15 parts of dimethyl benzyl amine, as catalyst, were mixed and reacted for 15 hours, at 120° C., with agitation.

A reaction product (XIII) having a number average molecular weight of 21,500 was obtained.

PREPARATION 14 (COMPARISON)

100 parts of di-methylglycidyl ether of bisphenol A (epoxide equivalent=3,500), 6 parts of bisphenol A, 80 parts of cyclohexanone and 0.15 parts of triethylamine, as catalyst, were mixed and reacted for 15 hours, at 100° C., with agitation.

A reaction product (XIV) having a number average molecular weight of 17,000 was obtained.

PREPARATION 15 (COMPARISON)

100 parts of diglycidyl ether of bisphenol F (epoxide equivalent=530), 7.08 parts of phosphorous acid and 60 parts of methyl ethylketone were mixed and reacted for 10 hours, at 70° C., with agitation.

A reaction product (XV) having a number average molecular weight of 17,000 was obtained.

PREPARATION 16 (COMPARISON)

100 parts of diglycidyl ether of bisphenol F (epoxide equivalent=530), 18 parts of bisphenol F, 80 parts of methyl isobutylketone and 0.15 parts of dimethyl benzylamine, as catalyst, were mixed and reacted for 20 hours, at 110° C., with agitation.

A reaction product (XVI) having a number average molecular weight of 18,500 was obtained.

EXAMPLES 1-8 AND COMPARATIVE EXAMPLES 1-8

Each solution obtained by each of the foregoing Preparations was coated on a rusty steel plate. The steel plate had been exposed to outdoor conditions for one year and then was treated to remove the flaky rust to obtain the grade of DSal of the SIS standard. The coating is cured for one week under room temperature.

The results of the tests of the coatings of the present invention in respect to adhesiveness and anticorrosive properties are better than the comparative examples as is shown in the following Table.

TABLE 1

|  | Example 1 | Example 2 | Example 3 | Example 4 | Example 5 | Example 6 | Example 7 | Example 8 |
|---|---|---|---|---|---|---|---|---|
| Preparation Number | 1 | 2 | 3 | 7 | 9 | 10 | 11 | 15 |
| Thickness of Coating ($\mu$) | 60 | 65 | 60 | 65 | 75 | 75 | 70 | 75 |
| Hardness (by pencil)* | H | 2H | H | H | 2H | HB | H | HB |
| Adhesiveness |  |  |  |  |  |  |  |  |
| Adhesive Tape Test *4 (No/No) | 100/100 | 100/100 | 100/100 | 100/100 | 100/100 | 100/100 | 100/100 | 100/100 |

TABLE 1-continued

| | | | | | | | | |
|---|---|---|---|---|---|---|---|---|
| (Cross Cut) Drawing Test *4 (No/No) (500 gr) Flexibility *4 (6 mm Mandrel) Anticorrosive Property | 10/10 | 10/10 | 10/10 | 10/10 | 10/10 | 10/10 | 10/10 | 10/10 |
| Salt Spray *5 Test (5% NaCl, 500 hours) | pass | pass | pass | pass | pass | pass | pass | pass |
| Salt Solution Test (dipped in 5% NaCl, 1 month) | pass | pass | pass | pass | pass | pass | pass | pass |

| | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Preparation Number | 4 | 5 | 6 | 8 | 12 | 13 | 14 | 16 |
| Thickness of Coating (μ) | 65 | 60 | 60 | 60 | 75 | 70 | 75 | 70 |
| Hardness (by pencil)* | H | 2H | H | 2H | H | HB | H | H |
| Adhesiveness | | | | | | | | |
| Adhesive Tape Test *4 (No/No) (Cross Cut) | 50/100 | 30/100 | 20/100 | 50/100 | 30/100 | 20/100 | 15/100 | 25/100 |
| Drawing Test *4 (No/No) (500 gr) Flexibility *4 (6 mm Mandrel) Anticorrosive Property | 3/10 | 4/10 | 3/10 | 3/10 | 2/10 | 2/10 | 1/10 | 3/10 |
| Salt Spray *5 Test (5% NaCl, 500 hours) | partially peeled off | partially peeled off | partially peeled off | partially peeled off | partially peeled off | partially peeled off | peeled off | peeled off |
| Salt Solution Test (dipped in 5% NaCl, 1 month) | swelled overall | swelled overall | swelled overall | swelled overall | swelled overall | swelled overall | swelled overall | swelled overall |

Note:
*4: Tested as described in JIS K-5400
*5: Tested as described in JIS K-2371

We claim:

1. A coating composition containing, as essential components, the high molecular weight reaction product of the reaction between;

(A) an epoxide resin having the following general formula (1);

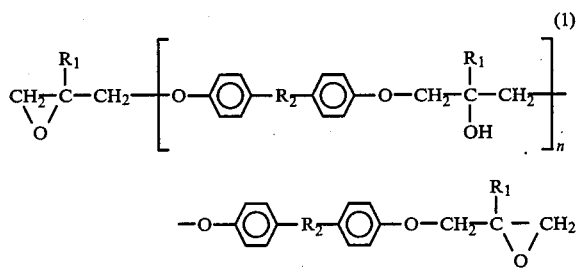

wherein $R_1$ is H or $CH_3$; $R_2$ is $-CH_2-$ or

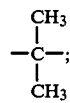

and n is a number of from 5 to 30, and, (B) at least one compound selected from the group consisting of:
(B-1) polynuclear polyhydroxy phenols having adjacent hydroxy groups,
(B-2) polyol esters of polyhydroxy phenolic carboxylic acids having adjacent hydroxy groups, and mixtures of (B-1) and (B-2);

wherein the molar ratio of (B-1) and/or (B-2) to (A) is such that hydroxy groups remain in the reaction product of (A) with (B-1) and/or (B-2), and said reaction product being dissolved or dispersed in an organic solvent.

2. A coating composition according to claim 1, wherein the molar ratio of epoxy groups in (A)/hydroxy groups in (B-1) and/or (B-2) is from 0.3 to 0.01.

3. A coating composition according to claim 2, wherein the molar ratio of expoxy groups in (A)/hydroxy groups in (B-1) and/or (B-2) is from 0.1 to 0.05.

4. A coating composition according to claim 1, wherein the number n is from 10 to 25.

5. A method of providing an anticorrosive coating on a metal substrate which comprises coating the metal substrate with an adherent coating film of a composition as claimed in claim 1, and then drying said film.

6. A method as claimed in claim 5 in which said metal substrate is rusty steel.